United States Patent
Kennedy et al.

(10) Patent No.: US 8,258,200 B2
(45) Date of Patent: Sep. 4, 2012

(54) POLYMER NETWORKS, PROCESS FOR PRODUCING SAME, AND PRODUCTS MADE THEREFROM

(75) Inventors: Joseph P. Kennedy, Akron, OH (US); Ummadisetty Subramanyam, Hattiesburg, MS (US)

(73) Assignee: The University of Akron, Akron, OH (US)

( * ) Notice: Subject to any disclaimer, the term of this patent is extended or adjusted under 35 U.S.C. 154(b) by 176 days.

(21) Appl. No.: 12/792,644

(22) Filed: Jun. 2, 2010

(65) Prior Publication Data

US 2010/0305231 A1    Dec. 2, 2010

Related U.S. Application Data

(60) Provisional application No. 61/183,357, filed on Jun. 2, 2009.

(51) Int. Cl.
*C08G 77/442*    (2006.01)
(52) U.S. Cl. ............... 522/99; 525/100; 528/29; 528/44
(58) Field of Classification Search .................. None
See application file for complete search history.

(56) References Cited

U.S. PATENT DOCUMENTS

| | | | |
|---|---|---|---|
| 4,822,850 A * | 4/1989 | Yashuda et al. | 528/28 |
| 5,508,317 A | 4/1996 | Muller | |
| 5,583,163 A | 12/1996 | Muller | |
| 5,789,464 A | 8/1998 | Muller | |
| 5,849,810 A | 12/1998 | Muller | |
| 6,407,145 B1 | 6/2002 | Muller | |

FOREIGN PATENT DOCUMENTS

JP    64-82032    *    3/1989

OTHER PUBLICATIONS abstract for JP 64-82302 (Mar. 1989) which is the same as 01-82032 but according to a different numbering system.*

* cited by examiner

*Primary Examiner* — Marc Zimmer
(74) *Attorney, Agent, or Firm* — Renner Kenner Greive Bobak Taylor & Weber

(57) ABSTRACT

The present invention relates to the production of copolymer networks, or co-networks, and to methods for preparing copolymer or co-networks. Furthermore, the present invention relates to products and/or films made from the copolymer and/or co-networks produced in accordance with the synthesis methods of the present invention. Additionally, the present invention relates to crosslinked copolymer and/or co-networks comprising at least one hydrophilic segment and at least one hydrophobic segment. In one embodiment, the hydrophilic segments include at least one poly(vinyl alcohol) (e.g., a poly(vinyl alcohol) modified with acryl amide groups) and the hydrophobic segments include at least one polysiloxane having at least one terminal —OH group (e.g., polydimethylsiloxane (PDMS)). In another embodiment, the copolymer and/or co-networks of the present invention are optically clear and highly oxophilic.

68 Claims, 5 Drawing Sheets

POLYMER NETWORKS, PROCESS FOR PRODUCING SAME, AND PRODUCTS MADE THEREFROM

RELATED APPLICATION DATA

This patent application claims priority to U.S. Provisional Patent Application No. 61/183,357, filed on Jun. 2, 2009, entitled "PVA Networks Grafted with PDMS Branches," the entirety of which is hereby incorporated by reference herein.

FIELD OF THE INVENTION

The present invention relates to the production of copolymer networks, or co-networks, and to methods for preparing copolymer or co-networks. Furthermore, the present invention relates to products and/or films made from the copolymer and/or co-networks produced in accordance with the synthesis methods of the present invention. Additionally, the present invention relates to crosslinked copolymer and/or co-networks comprising at least one hydrophilic segment and at least one hydrophobic segment. In one embodiment, the hydrophilic segments include at least one poly(vinyl alcohol) (e.g., a poly(vinyl alcohol) modified with acryl amide groups) and the hydrophobic segments include at least one polysiloxane having at least one terminal —OH group (e.g., polydimethylsiloxane (PDMS)). In another embodiment, the copolymer and/or co-networks of the present invention are optically clear and highly oxophilic.

BACKGROUND OF THE INVENTION

Polymer co-networks can serve as a means to encapsulate and thereby immunoisolate implantable biologically active moieties. Generally, polymer co-networks comprise hydrophilic and hydrophobic polymers that can swell in both polar and non-polar solvents.

Additionally, polymer networks and/or co-networks can be used to produce polymer films that swell in both polar and non-polar solvents. Accordingly, films made from polymer networks and/or co-networks have been found to be desirable in the production of contact lenses.

One problem associated with the synthesis of polymer, or copolymer, networks is how to overcome the thermodynamic incompatibility of the hydrophilic and hydrophobic constituents that will make up the network, and to unite two incompatible pre-polymers and/or polymers into a bi-continuous/bi-percolating construct. Typically, crosslinking of such systems is carried out in homogeneous solution in a common solvent at low pre-polymer and/or polymer concentrations, followed by the addition of a suitable crosslinker (i.e., by dissolving the two pre-polymers which are generally incompatible in their dry states). While this method yields uniform co-networks, the removal of the common solvent is accompanied by massive shrinkage, which renders the method technically impractical. Also, the dimensional stability of such networks, or co-networks, is poor, the surface properties are hard to control, and the networks, or co-networks, (or products formed therefrom) are fragile and difficult to manipulate.

Thus, there is a need in the art for reliable synthesis routes for polymer networks, or co-networks. Specifically, desirable synthesis routes would include those that permit the control of one or more chemical and/or physical properties of a polymer network, or co-network. Also of interest are synthesis routes for polymer networks, or co-networks, that produce networks that are suitable for use in medical (e.g., cell encapsulation), biological and ophthalmic uses.

SUMMARY OF THE INVENTION

The present invention relates to the production of copolymer networks, or co-networks, and to methods for preparing copolymer or co-networks. Furthermore, the present invention relates to products and/or films made from the copolymer and/or co-networks produced in accordance with the synthesis methods of the present invention. Additionally, the present invention relates to crosslinked copolymer and/or co-networks comprising at least one hydrophilic segment and at least one hydrophobic segment. In one embodiment, the hydrophilic segments include at least one poly(vinyl alcohol) (e.g., a poly(vinyl alcohol) modified with acryl amide groups) and the hydrophobic segments include at least one polysiloxane having at least one terminal —OH group (e.g., polydimethylsiloxane (PDMS)). In another embodiment, the copolymer and/or co-networks of the present invention are optically clear and highly oxophilic.

In one embodiment, the present invention relates to a polymer compound comprising the reaction product of: (I) at least one polydimethylsiloxane polymer in accordance with Formula (I) below:

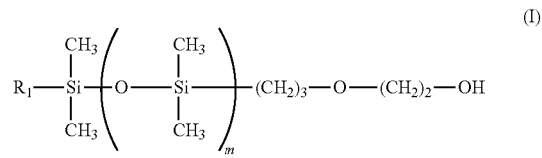

where m is equal to an integer in the range of about 5 to about 5,000 and where $R_1$ is a $C_1$ to $C_{20}$ linear alkyl group, or a $C_3$ to $C_{20}$ branched alkyl group; (II) at least one poly(vinyl alcohol) having at least one photoactive and/or photoreactive group per polymer chain; and (III) at least one isocyanate.

In another embodiment, the present invention relates to a polymer compound comprising the reaction product of: (i) at least one polydimethylsiloxane polymer in accordance with Formula (II) below:

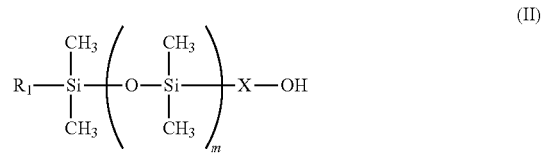

where m is equal to an integer in the range of about 5 to about 5,000, where $R_1$ is a $C_1$ to $C_{20}$ linear alkyl group, or a $C_3$ to $C_{20}$ branched alkyl group, and where X is a $C_1$ to $C_{20}$ linear alkyl group, a $C_3$ to $C_{20}$ branched alkyl group, a $C_2$ to $C_{20}$ ether group; (ii) at least one poly(vinyl alcohol) having at least one photoactive and/or photoreactive group per polymer chain; and (iii) at least one isocyanate.

In yet another embodiment, the present invention relates to a method for producing a polymer compound comprising the steps of: (A) providing at least one polydimethylsiloxane polymer in accordance with Formula (I) below:

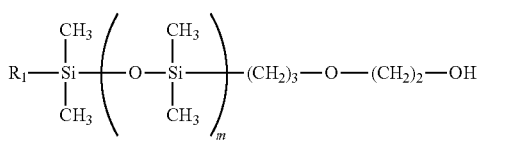

(I)

where m is equal to an integer in the range of about 5 to about 5,000 and where $R_1$ is a $C_1$ to $C_{20}$ linear alkyl group, or a $C_3$ to $C_{20}$ branched alkyl group; (B) providing at least one poly(vinyl alcohol) having at least one photoactive and/or photoreactive group per polymer chain; (C) providing at least one isocyanate; and (D) reacting the compounds provided in Steps (A), (B) and (C) to produce a $PVA_{AA}$-g-PDMS polymer compound.

In still another embodiment, the present invention relates to a method for producing a polymer compound comprising the steps of: (a) providing at least one polydimethylsiloxane polymer in accordance with Formula (II) below:

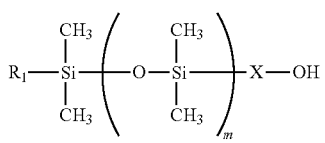

(II)

where m is equal to an integer in the range of about 5 to about 5,000, where $R_1$ is a $C_1$ to $C_{20}$ linear alkyl group, or a $C_3$ to $C_{20}$ branched alkyl group, and where X is a $C_1$ to $C_{20}$ linear alkyl group, a $C_3$ to $C_{20}$ branched alkyl group, a $C_2$ to $C_{20}$ ether group; (b) providing at least one polyvinyl alcohol having at least one photoactive and/or photoreactive group per polymer chain; (c) providing at least one isocyanate; and (d) reacting the compounds provided in Steps (a), (b) and (c) to produce a $PVA_{AA}$-g-PDMS polymer compound.

In still another embodiment, the present invention relates to a method for producing a polymer compound comprising the steps of: (1) providing at least one polydimethylsiloxane polymer in accordance with either Formula (I) or Formula (II) below:

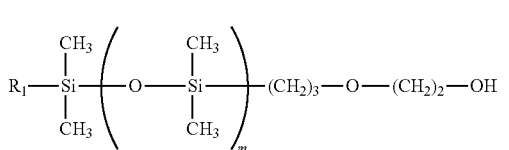

(I)

where m is equal to an integer in the range of about 5 to about 5,000 and where $R_1$ is a $C_1$ to $C_{20}$ linear alkyl group, or a $C_3$ to $C_{20}$ branched alkyl group, or

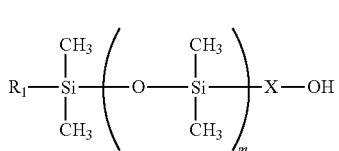

(II)

where m is equal to an integer in the range of about 5 to about 5,000, where $R_1$ is a $C_1$ to $C_{20}$ linear alkyl group, or a $C_3$ to $C_{20}$ branched alkyl group, and where X is a $C_1$ to $C_{20}$ linear alkyl group, a $C_3$ to $C_{20}$ branched alkyl group, a $C_2$ to $C_{20}$ ether group; (2) conducting a solvent-based polymerization reaction by combining the at least one polydimethylsiloxane polymer in accordance with either Formula (I) or Formula (II) with at least one isocyanate and at least one catalyst in a suitable solvent to yield a polydimethylsiloxane polymer functionalized with at least one —NCO group; and (3) combining the polydimethylsiloxane polymer functionalized with at least one —NCO group with at least one poly(vinyl alcohol) having at least one photoactive and/or photoreactive group per polymer chain and at least one binary solvent mixture to yield a $PVA_{AA}$-g-PDMS polymer compound.

DETAILED DISCLOSURE OF THE INVENTION

Figure 1:
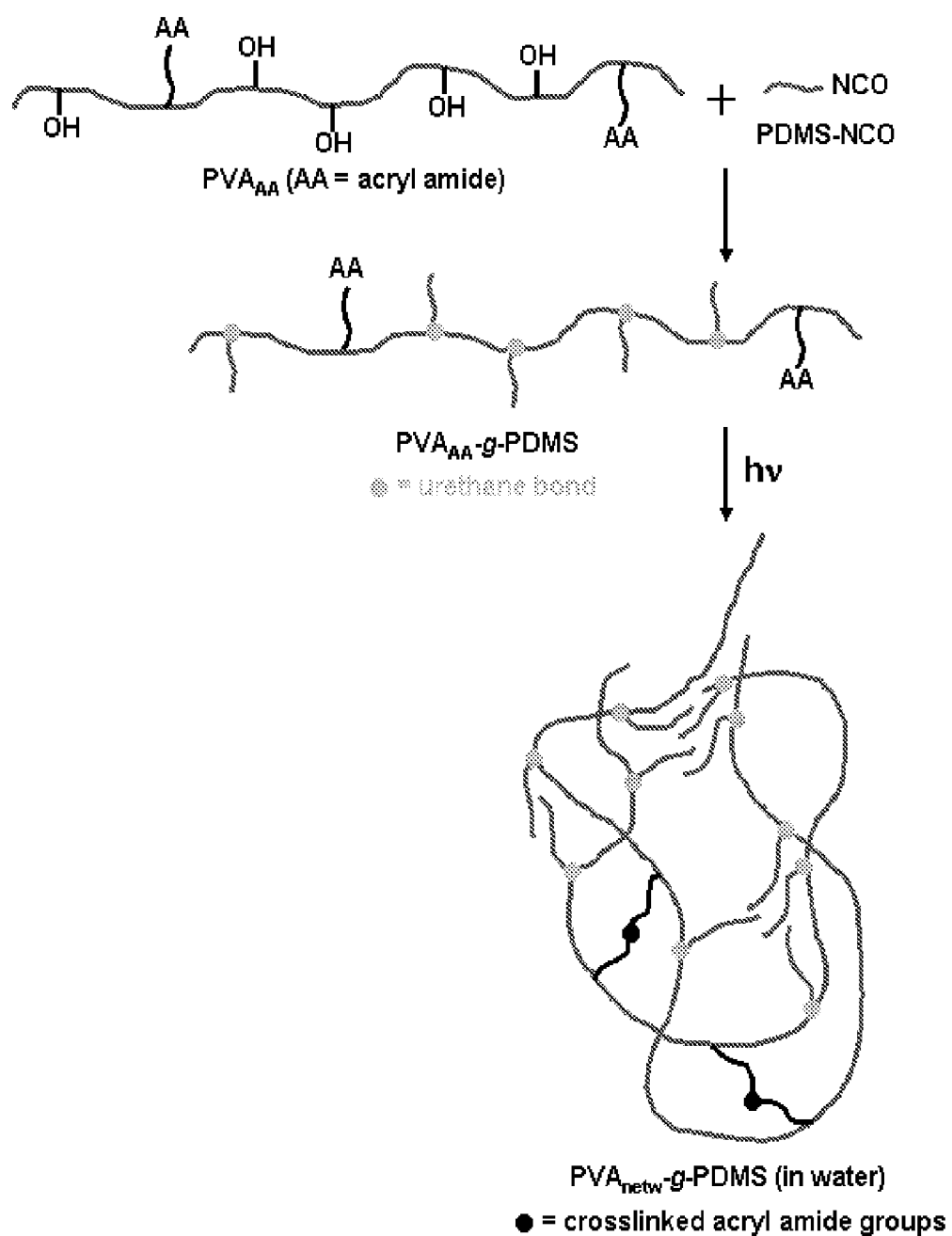
FIG. 1 is an illustration of an exemplary synthesis route for a network, or co-network, according to one embodiment of the present invention.

The present invention relates to the production of copolymer networks, or co-networks, and to methods for preparing copolymer or co-networks. Furthermore, the present invention relates to products and/or films made from the copolymer and/or co-networks produced in accordance with the synthesis methods of the present invention. Additionally, the present invention relates to crosslinked copolymer and/or co-networks comprising at least one hydrophilic segment and at least one hydrophobic segment. In one embodiment, the hydrophilic segments include at least one poly(vinyl alcohol) (e.g., a poly(vinyl alcohol) modified with acryl amide groups) and the hydrophobic segments include at least one polysiloxane having at least one terminal —OH group (e.g., polydimethylsiloxane (PDMS)). In another embodiment, the copolymer and/or co-networks of the present invention are optically clear and highly oxophilic.

Polymers:

As is discussed above, the crosslinked copolymer networks, or co-networks, of the present invention contain at least one hydrophobic polymer and at least one hydrophilic polymer.

In one embodiment, the present invention utilizes a combination of at least one poly(vinyl alcohol) polymer with at least one siloxane polymer having at least one terminal hydroxyl (OH) group therein (e.g., polydimethylsiloxane (PDMS)) to form copolymer networks (also referred to herein as co-networks). In such an embodiment, the at least one poly(vinyl alcohol) polymer functions as the hydrophilic polymer, while the at least one hydroxyl-terminated polysiloxane siloxane polymer functions as the hydrophobic polymer. In one instance, each polymer used to form the co-networks of the present invention independently have from about 5 to about 5,000 repeating polymer units, or from about 10 to about 2,500 repeating polymer units, or from about 25 to about 1,000 repeating polymer units, or even from about 40 to about 500 repeating polymer units. Here, as well as elsewhere in the specification and claims, individual range limits can, or may, be combined to form additional and/or non-disclosed ranges.

It should be noted that the present invention is not limited to polymers having the above-mentioned number of repeating units. Instead, the present invention can utilize any suitable combination of hydrophilic and hydrophobic polymers having any number of repeating units so long as the polymers used can form co-networks. Another consideration that needs to be taken into account when choosing the polymers used to form the co-networks of the present invention is the intended use for the co-network. For example, if the co-network is going to be formed into a film to be used as a contact lens, then the polymers used in the present invention should at a minimum yield optically transparent co-networks. As would be apparent to one of ordinary skill in the art, depending upon the desired use for the co-networks of the present invention, one may have to take into consideration a wide variety of physical, chemical and/or mechanical properties of the polymers used to form such networks.

In another embodiment, the present invention utilizes a combination of at least one poly(vinyl alcohol) polymer with at least one polydimethylsiloxane polymer. Exemplary poly(vinyl alcohol)s (PVAs) include, but are not limited to, those PVAs that include one or more photoactive and/or photoreactive groups per PVA polymer chain. Suitable photoactive and/or photoreactive PVAs include those with acryl amide photoreactive groups. Such compounds, as well as other PVAs suitable for use in conjunction with the present invention, are described in U.S. Pat. Nos. 5,508,317; 5,583,163; 5,789,464; 5,849,810; and 6,407,145, the disclosures of which are hereby incorporated in their entireties herein. In one embodiment, exemplary poly(vinyl alcohol)s (PVAs) for use in conjunction with the present invention include, but are not limited to, PVAs that include two or more, three or more, or even four or more photoactive and/or photoreactive groups per PVA polymer chain. In another embodiment, suitable PVAs for use in conjunction with the present invention contain one or more, two or more, three or more, or even four or more photoactive and/or photoreactive groups per PVA polymer chain and have a molecular weight of about 4,000 to about 25,000 grams per mole, or from about 5,000 to about 22,500 grams per mole, or from about 7,500 to about 20,000 grams per mole, or from about 10,000 to about 17,500 grams per moles, or even from about 12,500 to about 15,000 grams per mole. Here, as well as elsewhere in the specification and claims, individual range limits can be combined to form additional and/or non-disclosed ranges.

Turning to the polydimethylsiloxane polymers for use in conjunction with the present invention, such polymers include polydimethylsiloxane polymers in accordance with Formula (I) below:

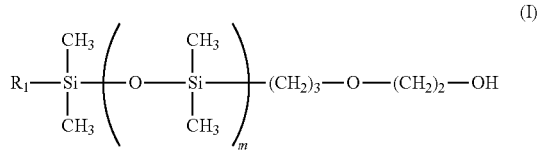

(I)

where m is equal to an integer in the range of about 5 to about 5,000, or from about 10 to about 2,500, or from about 25 to about 1,000, or even from about 40 to about 500; and where $R_1$ is a $C_1$ to $C_{20}$ linear alkyl group, or a $C_3$ to $C_{20}$ branched alkyl group. In another embodiment, $R_1$ is a $C_3$ to $C_{15}$ linear alkyl group, or a $C_5$ to $C_{15}$ branched alkyl group. In still another embodiment, $R_1$ is a $C_5$ to $C_{10}$ linear alkyl group, or a $C_7$ to $C_{10}$ branched alkyl group. Here, as well as elsewhere in the specification and claims, individual range limits (including carbon number values) can be combined to form additional and/or non-disclosed ranges.

In another embodiment, suitable polydimethylsiloxane polymers for use in conjunction with the present invention include polydimethylsiloxane polymers in accordance with Formula (II) below:

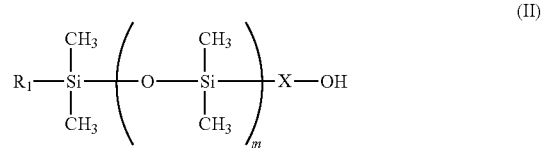

(II)

where m is equal to an integer in the range of about 5 to about 5,000, or from about 10 to about 2,500, or from about 25 to about 1,000, or even from about 40 to about 500; where $R_1$ is a $C_1$ to $C_{20}$ linear alkyl group, or a $C_3$ to $C_{20}$ branched alkyl group; and where X is a $C_1$ to $C_{20}$ linear alkyl group, a $C_3$ to $C_{20}$ branched alkyl group, or a $C_2$ to $C_{20}$ ether group (i.e., —R'—O—R"—, where R' and R" each contained at least one carbon atom and the total of the carbon atoms in R' and R" is between, for example, 2 and 20).

In another embodiment, $R_1$ is a $C_3$ to $C_{15}$ linear alkyl group, or a $C_5$ to $C_{15}$ branched alkyl group; and X is $C_3$ to $C_{15}$ linear alkyl group, a $C_5$ to $C_{15}$ branched alkyl group, or a $C_3$ to $C_{15}$ ether group. In still another embodiment, $R_1$ is a $C_5$ to $C_{10}$ linear alkyl group, or a $C_7$ to $C_{10}$ branched alkyl group; and X is a $C_5$ to $C_{10}$ linear alkyl group, a $C_7$ to $C_{10}$ branched alkyl group, or a $C_4$ to $C_{12}$ ether group. In still yet another embodiment, X is a $C_5$ to $C_{10}$ ether group, or even a $C_6$ to $C_8$ ether group. Here, as well as elsewhere in the specification and claims, individual range limits (including carbon number values) can be combined to form additional and/or non-disclosed ranges.

In still yet another embodiment, m and $R_1$ are as defined above and X, when it is an ether group, is a $C_2$ to $C_{20}$ alkyl ether group, a $C_3$ to $C_{15}$'alkyl ether group, a $C_4$ to $C_{12}$ alkyl ether group, a $C_5$ to $C_{10}$ alkyl ether group, or even a $C_6$ to $C_8$ alkyl ether group. In still yet another embodiment, m is defined as above; $R_1$ is a linear or branched butyl group (—$C_4H_9$) and X is a —($CH_2$)$_3$—O—($CH_2$)$_2$— ether group. Here, as well as elsewhere in the specification and claims, individual range limits (including carbon number values) can be combined to form additional and/or non-disclosed ranges.

In one embodiment, the polysiloxanes polymer utilized in conjunction with the present invention have a number average molecular weight ($M_n$) in the range of about 500 to about 11,000 grams per mole, or from about 650 to 9,000 grams per mole, or from about 800 to about 7,000 grams per mole, or even from about 950 to about 5,000 grams per mole. Here, as well as elsewhere in the specification and claims, individual range limits can be combined to form additional and/or non-disclosed ranges.

It should be noted that the present invention is not limited to just the above-mentioned PVAs and/or polydimethylsiloxane polymers of Formulas (I) and/or (II). Rather, in this embodiment any suitable combination of photoactive and/or photoreactive PVA polymers and PDMS polymers can be used. Such additional PDMS include PDMS polymers having two or more hydroxyl groups. Such polymers are known to those of skill in the art and as such, a discussion herein is omitted for the sake of brevity.

The polydimethylsiloxane polymers according to Formulas (I) and/or (II) can, for example, be purchased from Gelest, Tulleytown, Pa. Alternatively, if so desired, a polymer in accordance with either Formula (I) and/or (II) could be synthesized thereby permitting one to control the number of repeating units present in the polymer of Formula (I) and/or (II). With regard to the PVA polymers that are utilized in conjunction with the present invention, such polymers can be obtained from, for example, Ciba Vision Corporation, Tarrytown, N.Y.

In one embodiment, the amount of polydimethylsiloxane in a polymer compound (e.g., a $PVA_{AA}$-g-PDMS compound and/or a $PVA_{netw}$-g-PDMS network/co-network) according to any embodiments of the present invention ranges from about 5 weight percent PDMS to about 50 weight percent PDMS, from about 7.5 weight percent PDMS to about 47.5 weight percent PDMS, from about 10 weight percent PDMS to about 45 weight percent PDMS, from about 12.5 weight percent PDMS to about 42.5 weight percent PDMS, from about 15 weight percent PDMS to about 40 weight percent PDMS, from about 17.5 weight percent PDMS to about 37.5 weight percent PDMS, from about 20 weight percent PDMS to about 35 weight percent PDMS, from about 22.5 weight percent PDMS to about 32.5 weight percent PDMS, or even from about 25 weight percent PDMS to about 30 weight percent PDMS. In another embodiment, the amount of polydimethylsiloxane in a polymer compound (e.g., a $PVA_{AA}$-g-PDMS compound and/or a $PVA_{netw}$-g-PDMS network/co-network) according to any embodiments of the present invention ranges from about 15 weight percent PDMS to about 39 weight percent PDMS, or even from about 15 weight percent PDMS to about 37 weight percent PDMS. Here, as well as elsewhere in the specification and claims, individual range limits can be combined to form additional and/or non-disclosed ranges.

Given the above, the present invention will now be described with regard to one exemplary embodiment. However, it should be noted that the present invention is not limited thereto. Rather, the present invention encompasses all of the possible combinations and permutations in light of the range of various components utilized to form the networks, or co-networks, disclosed herein.

In one embodiment, the present invention relates to hydrophilic poly(vinyl alcohol) networks grafted with hydrophobic PDMS branches ($PVA_{netw}$-g-PDMS) that are obtained by photo-crosslinking PVA fitted with a desired number of photoactive acryl amide groups (at least one or more per PVA chain, at least two or more per PVA chain, at least three or more per PVA chain, or even at least four or more per PVA chain), and grafted with PDMS branches ($PVA_{AA}$-g-PDMS) (see FIG. 1). In one embodiment, the use of a binary solvent mixture (e.g., NMP/THF (67/33)) enables the thermodynamically unfavorable mixing of PDMS-NCO (polydimethylsiloxane fitted with NCO termini) with $PVA_{AA}$ and thus yields urethane linkage between such moieties. In the presence of a sufficient volume of PDMS branches PVA networks with co-continuous hydrophilic/hydrophobic domains can be obtained. These amphiphilic constructs can be used to produce, among other things, extended wear soft contact lenses.

A note of terminology/abbreviation as used herein, the target hydrophobized hydrophilic network does not satisfy the true definition of an amphiphilic co-network (APCN) because one of the termini of the grafted PDMS branches is free (dangling). According to the strict definition of APCNs both the hydrophilic and hydrophobic network constituents must be covalently linked and be part of the co-network. The target structure of the present invention is, in one embodiment, a grafted network that is abbreviated by $PVA_{netw}$-g-PDMS indicating a $PVA_{netw}$ fitted with PDMS branches. In one embodiment, the $PVA_{AA}$ is a polyvinyl alcohol with four acryl amide groups per chain and is available as NELFILCON A® from Ciba Vision Corporation, Tarrytown, N.Y.

In one embodiment, the present invention relates to a synthesis method for forming poly(vinyl alcohol) (PVA) networks fitted with polydimethylsiloxane (PDMS) branches ($PVA_{netw}$-g-PDMS). In one instance, the synthesis is achieved in two steps: (i) grafting by urethane linking PDMS carrying —NCO termini (PDMS-NCO) onto PVA fitted with a few (about four) photoreactive acryl amide groups ($PVA_{AA}$); and (ii) photo-crosslinking the $PVA_{AA}$-g-PDMS to $PVA_{netw}$-g-PDMS. The use of the binary N-methyl-2-pyrrolidone/tetrahydrofuran (NMP/THF, 67/33) solvent system enables the thermodynamically unfavorable mixing of hydrophobic PDMS branches with hydrophilic $PVA_{AA}$ backbones. The amphiphilic graft, $PVA_{AA}$-g-PDMS, is characterized by $^1$H NMR spectroscopy, and the final graft network, $PVA_{netw}$-g-PDMS, by FTIR spectroscopy, DSC, and equilibrium swelling. The grafting of sufficient volumes of PDMS branches onto $PVA_{AA}$ yields co-continuous hydrophilic/hydrophobic PVA/PDMS domains, whose existence is demonstrated by swelling in both water and hexanes.

As stated above, in one embodiment the present invention relates to a method, and the product derived therefrom, of assembling hydrophilic poly(vinyl alcohol) networks ($PVA_{netw}$) fitted with hydrophobic polydimethylsiloxane (PDMS) branches of sufficient volume (i.e., number and molecular weight) to yield co-continuous (percolating) hydrophilic/hydrophobic domains.

Poly(vinyl alcohol) network compositions ($PVA_{netw}$) are used to, for example, manufacture soft contact lenses. These contact lenses are prepared, in one embodiment, by photo-crosslinking PVA carrying a sufficient number of photoactive acrylamide groups ($PVA_{AA}$). The use of these lenses, however, is restricted to less than 24 hours of wear because of the relatively low $O_2$ permeability of the water-swollen $PVA_{netw}$. The low water permeability of these contact lenses is a consequence of the inherently low $O_2$ permeability of water. While not wishing to be bound to any one theory, it is believed that one could increase the $O_2$ permeability of $PVA_{netw}$ membranes by covalently attaching to it $O_2$ permeable PDMS branches in a manner that the PDMS forms co-continuous domains.

Thus, in one embodiment, the present invention relates to a synthesis scheme for producing PDMS-modified PVA networks adaptable for the manufacture of PVA-based extended wear soft contact lenses. Reaction Scheme 1, below, summarizes one method according to the present invention to synthesize PVA networks fitted with PDMS branches of sufficient volume to achieve co-continuity of both the PVA and the PDMS domains. This in turn permits one to achieve simultaneous diffusion of aqueous solutions through the water-swollen $PVA_{netw}$ domains and $O_2$ through the PDMS domains.

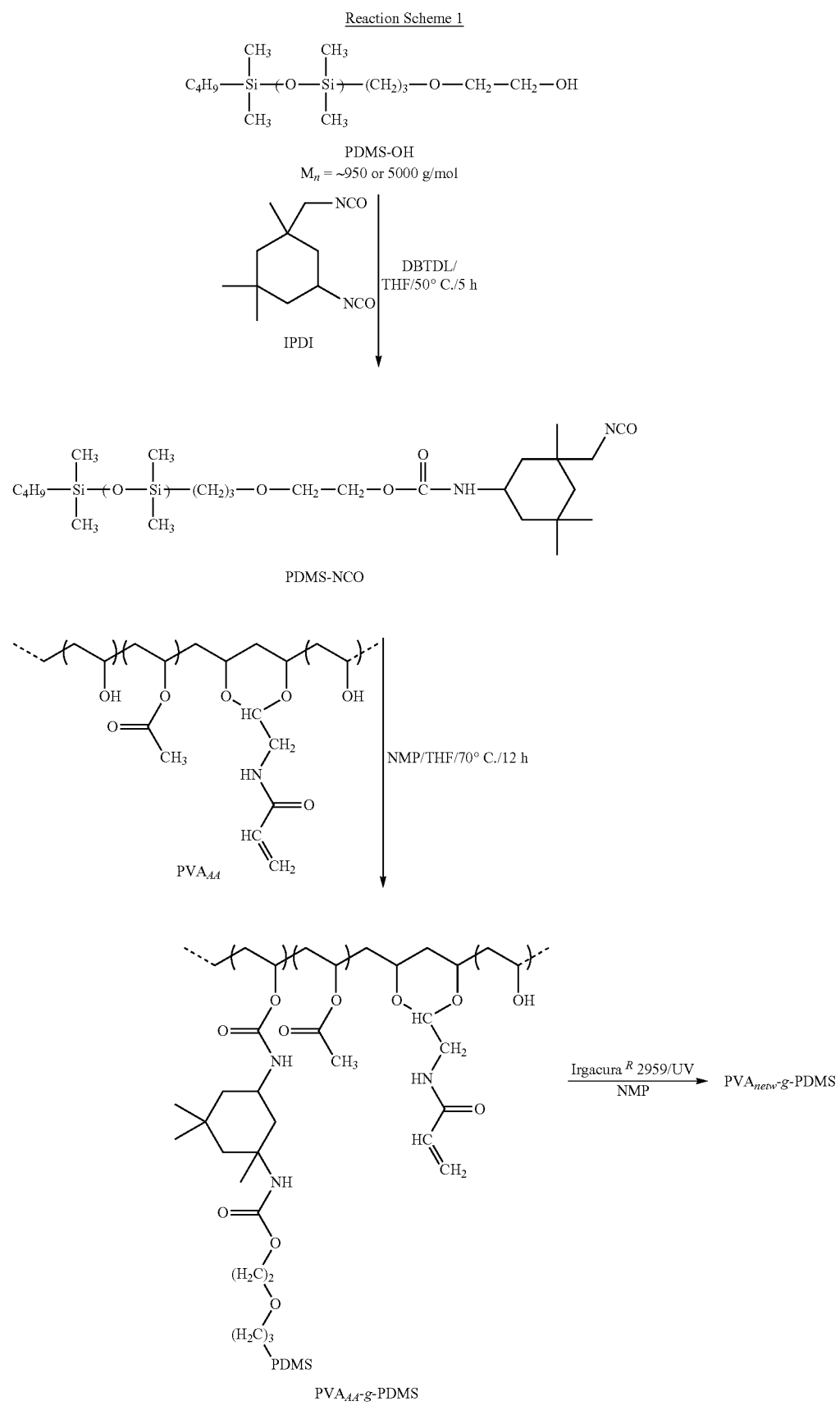

Experimental:

Some exemplary polymer compositions are discussed below. However, it should be noted that the present invention is not limited to the following examples. Rather, any suitable polymer network, or co-network, that can be formed in accordance with the starting materials disclosed herein is within the scope of the present invention.

Materials:

The $PVA_{AA}$ (NELFILCON A®) is obtained from Ciba Vision Corporation. According to the manufacturer the molecular weight of NELFILCON A® is about 14,000 grams per mole and it contains approximately four (4) acrylamide groups per PVA chain. PDMS-OH ($M_n$=about 950 grams per mole and about 5000 grams per mole) is obtained from Gelest, Tulleytown, Pa. Isophorone diisocyanate (IPDI), toluene-2,4-diisocyanate (TDI), dibutyltin dilaurate (DBTDL), tetrahydrofuran (THF), N-methyl-2-pyrrolidone (NMP), dimethylsulfoxide-$d_6$ (DMSO-$d_6$), and IRGACURA® 2959 are obtained from Aldrich.

Characterization:

Products extracted using water and hexanes are characterized. $^1$H NMR spectra are acquired on a Varian unity plus 300 MHz spectrometer with the use of DMSO as a solvent. FT-IR analysis is carried out with a Varian FTS 1000 spectrometer using KBr discs (1 mg polymer/100 mg KBr). DSC is performed with a Q2000 thermal analyzer (TA Instruments) under a nitrogen atmosphere, with a heating rate of 10° C./min from −150° C. to 200° C.

Swelling Measurement:

Pre-weighed films are placed in water or hexanes at room temperature, and the extent of swelling is determined by periodically removing the films from the liquids, removing the liquid absorbed to the surfaces by blotting with tissue paper, and weighing. The equilibrium degree of swelling (i.e., when the weight of the swollen film remained constant for 24 hours at room temperature) is obtained by:

$$D_{sw}=[(W_{sw}-W_{dry})/W_{dry}]\times 100$$

where $D_{sw}$ is the degree of swelling, and $W_{sw}$ and $W_{dry}$ are the weights of the swollen, and dry films, respectively (i.e., solvent uptake relative to the dry sample). Also the water or hexanes content ($W_\%$ or $Hex_\%$) of membranes is determined (i.e., solvent uptake relative to the swollen sample) using the equation below:

$$W_\% \text{ or } Hex_\%=[(W_{sw}-W_{dry})/W_{sw}]\times 100.$$

Syntheses:

Synthesis of $PVA_{AA}$-g-PDMS:

Grafting PDMS-OH onto $PVA_{AA}$ is carried out by urethane linking with IPDI or TDI. Although other isocyanate compounds can be utilized in conjunction with various other embodiments of the present invention.

An exemplary grafting onto $PVA_{AA}$ is carried out as follows: IPDI (0.51 grams, 2.31 mmol) is dissolved in dry THF (20 mL) and the resulting mixture is placed under a $N_2$ atmosphere in a 250 mL 3-neck round bottom flask fitted with a condenser, gas inlet/outlet tube, and a magnetic stirrer bar. To this solution is added drop-wise PDMS-OH ($M_n$=about 950 grams per mole −2 grams, 2.1 mmol) dissolved in THF (30 mL), and DBTDL catalyst (1 weight percent). The charge is stirred for 5 hours at 50° C. Subsequently, $PVA_{AA}$ (1 gram, 0.0714 mmol) is dissolved in 100 mL NMP (stored over molecular sieves for 5 hours) is added drop-wise, and the solution is stirred for 12 hours at 60° C. The charge becomes viscous after 3 hours, however, it remains homogeneous throughout the reaction. The NMP and THF are removed under vacuum.

The product is extracted twice each with hot hexanes and water to remove unreacted PDMS and $PVA_{AA}$, respectively. Hexanes-soluble fraction is 1.35 grams and the water-soluble fraction is absent. The yield of $PVA_{AA}$-g-PDMS is 1.65 grams and contains 39.4 weight percent PDMS via gravimetric analysis. Grafting efficiency is determined to be 32.5 percent (see Table 1).

An experiment is performed using PDMS-OH ($M_n$=about 5,000 grams per mole −1 gram, 0.2 mmol), IPDI (0.22 mmol), $PVA_{AA}$ (1 gram, 0.0714 mmol) under the same conditions. The hexanes-soluble fraction is 0.7 grams and the water-soluble fraction is absent. The yield of $PVA_{AA}$-g-PDMS is 1.3 grams and contains 23.1 weight percent PDMS. Grafting efficiency is determined to be 30 percent.

Photo-Crosslinking:

To 500 mg $PVA_{AA}$-g-PDMS dissolved in 10 mL DMF is added 0.25 weight percent IRGACURA® 2959, and the charge is stirred for 5 minutes under a nitrogen atmosphere. Subsequently, the charge is poured into a Teflon mold (5×5 cm) and cured by UV radiation for 10 seconds via the use of a Fusion UV System instrument. The DMF is evaporated by placing the mold in an oven for 6 hours at 70° C. The resultant optically transparent and colorless film is insoluble in DMF, DMSO and NMP, which indicates crosslinking.

Results and Discussion:

Synthesis of $PVA_{netw}$-g-PDMS:

Reaction Scheme 1, above, outlines one possible embodiment according to the present invention for the synthesis of $PVA_{netw}$-g-PDMS. The synthesis occurs in two steps: (1) synthesis of the graft, $PVA_{AA}$-g-PDMS; and (2) photo-crosslinking to $PVA_{netw}$-g-PDMS.

$PVA_{AA}$ is soluble in NMP but insoluble in THF. In contrast, PDMS-NCO is soluble in THF but insoluble in NMP. In one embodiment, the present invention utilizes a binary solvent system (e.g., NMP/THF (67/33)) that dissolves both of the polymeric starting materials and enables the grafting of PDMS-NCO onto $PVA_{AA}$ by urethane linking. Table 1 details the representative characterization data.

TABLE 1

Characterization of $PVA_{netw}$-g-PDMS

| Ex. No. | Sample[a] | PDMS[b] (wt %) | $G_{eff}$[c] (%) | Number of PDMS branches per $PVA_{AA}$[d] | Thermal Transitions by DSC $T_m$ (° C.) | $T_g$ (° C.) | Equilibrium Swelling (%) Water | Hexanes | Content (%) Water | Hexanes |
|---|---|---|---|---|---|---|---|---|---|---|
| 1 | $PVA_{netw}$[10] | | | | 180 | 75 | — | 0 | 69 | 0 |
| 2 | $PVA_{netw}$-g-$PDMS_{IPDI}$ | 15.3 | 18 | 2.7 | a | −125, −83, 73 | 43.5 | 7 | 30 | 6.5 |

TABLE 1-continued

Characterization of PVA$_{netw}$-g-PDMS

| Ex. No. | Sample[a] | PDMS[b] (wt %) | G$_{eff}$[c] (%) | Number of PDMS branches per PVA$_{AA}$[d] | Thermal Transitions by DSC | | Equilibrium | | | |
|---|---|---|---|---|---|---|---|---|---|---|
| | | | | | T$_m$ (° C.) | T$_g$ (° C.) | Swelling (%) | | Content (%) | |
| | | | | | | | Water | Hexanes | Water | Hexanes |
| 3 | PVA$_{netw}$-g-PDMS$_{IPDI}$ | 39.4 | 32.5 | 9.6 | a | −122, −80, 80 | 14 | 55 | 12 | 35.5 |
| 4 | PVA$_{netw}$-g-PDMS$_{TDI}$ | 37 | 29 | 8.6 | a | nd | 12 | 28 | 11 | 22 |

[a]The subscript IPDI and TDI indicate the diisocyanate used for the synthesis of the graft;
[b]M$_n$ PDMS = about 950 grams per mole;
[c]G$_{eff}$(%) = [Grafted PDMS/(Grafted PDMS + Homo PDMS)] × 100;
[d]Mole percent PDMS/mole percent PVA$_{AA}$;
a = absent; and nd = not determined.

Figure 2:
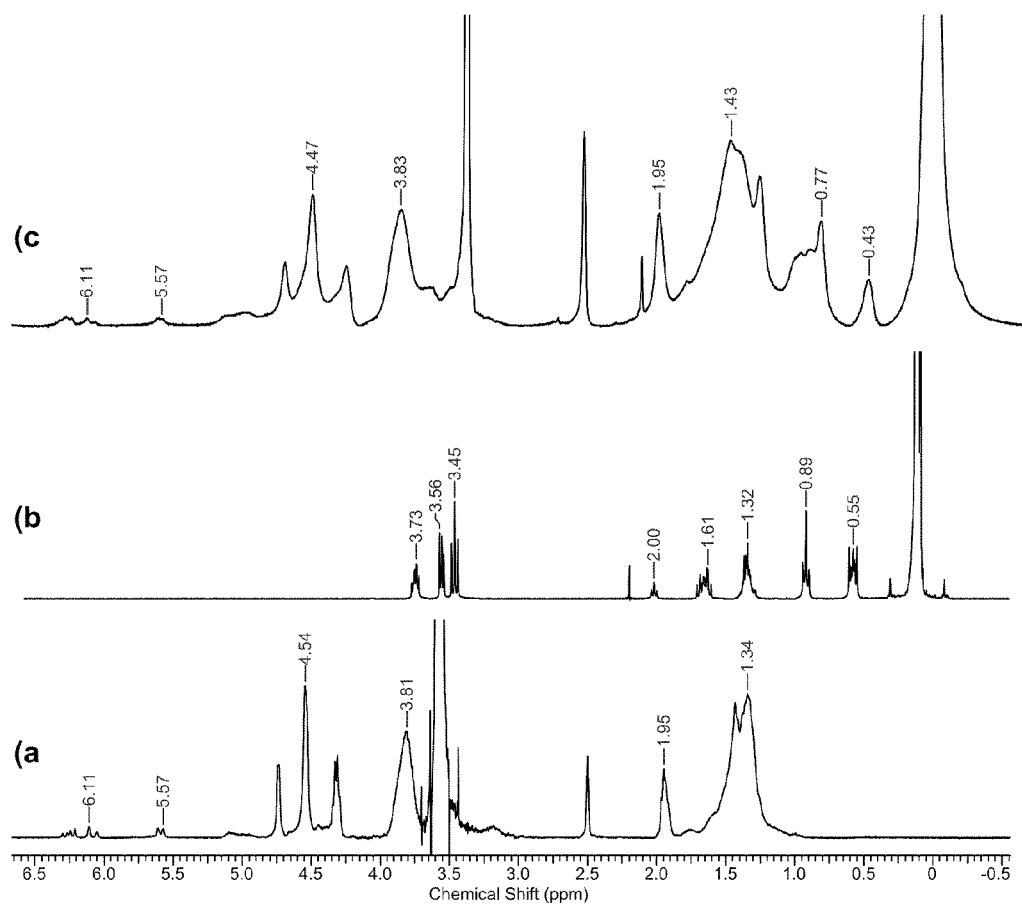
FIGS. 2(a) to 2(c) are $^1H$ NMR spectra of: (a) $PVA_{AA}$ in DMSO-$d_6$; (b) PDMS-OH in $CDCl_3$; and (c) $PVA_{AA}$-g-PDMS in DMSO-$d_6$.

Characterization —$^1$H NMR Spectroscopy:

FIG. 2—$^1$H NMR spectra of: (a) PVA$_{AA}$ in DMSO-d$_6$; (b) PDMS-OH in CDCl$_3$: and (c) PVA$_{AA}$-g-PDMS in DMSO-d$_6$. PVA$_{AA}$ (FIG. 2(a)) shows the following main resonances (in ppm): 6.11 (CH$_2$=CH—); 5.57 (CH$_2$=CH—); 4.54 (—CH$_2$—CH(OH)—); 3.82 (—CH$_2$—CH(OH)—); 1.95 (CH$_3$—C(OO)—); 1.34 (—CH$_2$—CH(OH)—). PDMS-NCO (FIG. 2(b)) shows resonances (in ppm) at 3.73 (OH—CH$_2$—CH$_2$—) and 0.07 (—Si(CH$_3$)$_2$—O—). PVA$_{AA}$-g-PDMS (FIG. 2(c)) shows strong resonances at: −0.05 (—Si(CH$_3$)$_2$—O—); 0.43 (—Si(CH$_3$)$_2$—CH$_2$—); and 0.77 ppm (—Si(CH$_3$)$_2$—CH$_2$—CH$_2$—CH$_2$—CH$_3$), which indicate PDMS incorporation. The resonances at 6.11 and 5.57 ppm indicate the presence of acryl amide groups.

Figure 3:
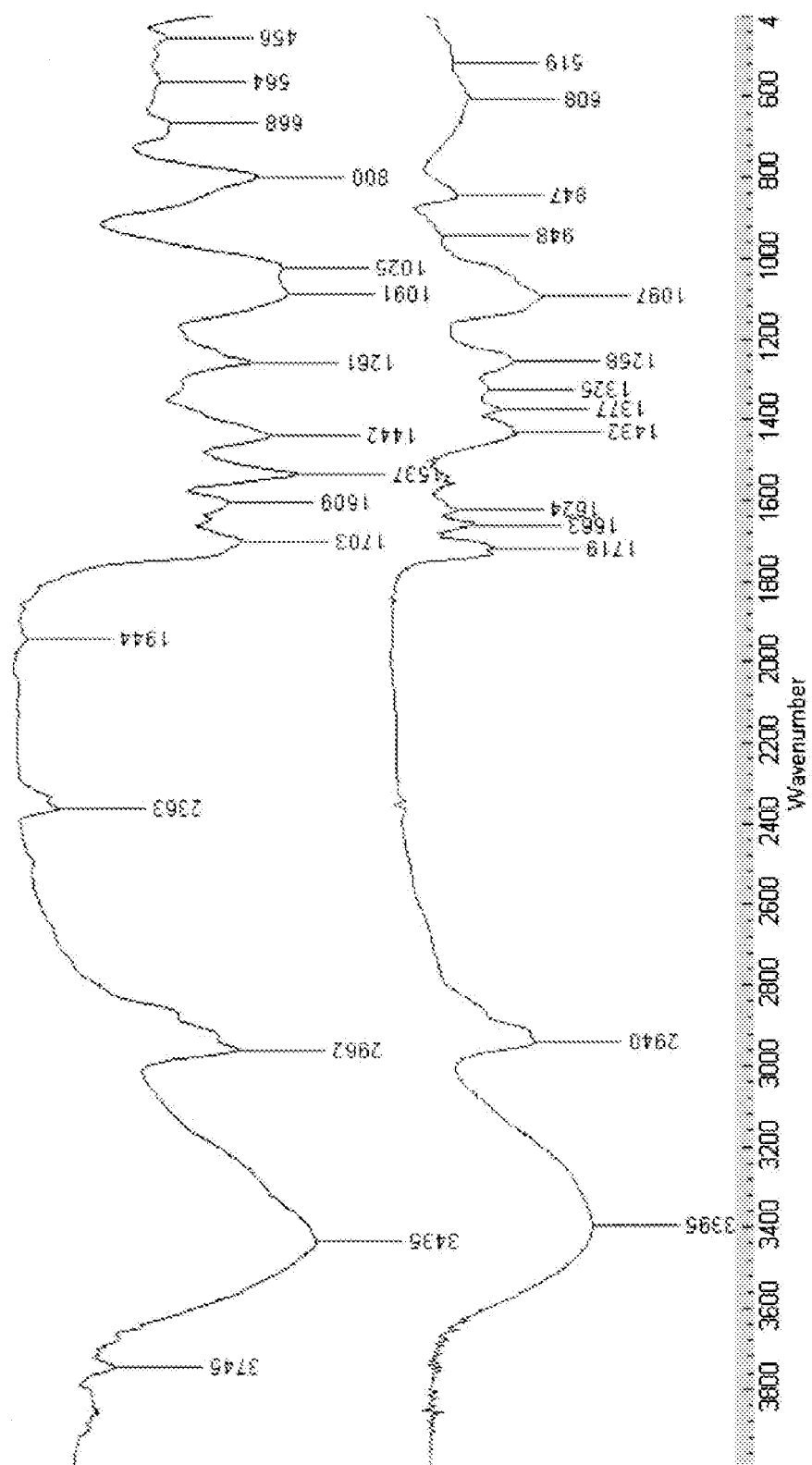
FIG. 3 is a set of FT-IR spectra for: $PVA_{AA}$; and $PVA_{netw}$-g-PDMS.

FT-IR Spectroscopy:

FIG. 3 shows the FT-IR spectra of PVA$_{AA}$ (bottom spectra) and PVA$_{netw}$-g-PDMS (tope spectra—Sample 3 of Table 1). In the top spectra of FIG. 3, the absorptions at 800 cm$^{-1}$ (CH$_3$—Si rocking) and 1025 cm$^{-1}$ (Si—O—Si stretching) indicate the presence of PDMS. Absorptions at 1537 and 1091 cm$^{-1}$ are due to N—H bending and C—O—C stretching, and indicate the presence of urethane linking.

Figure 4:
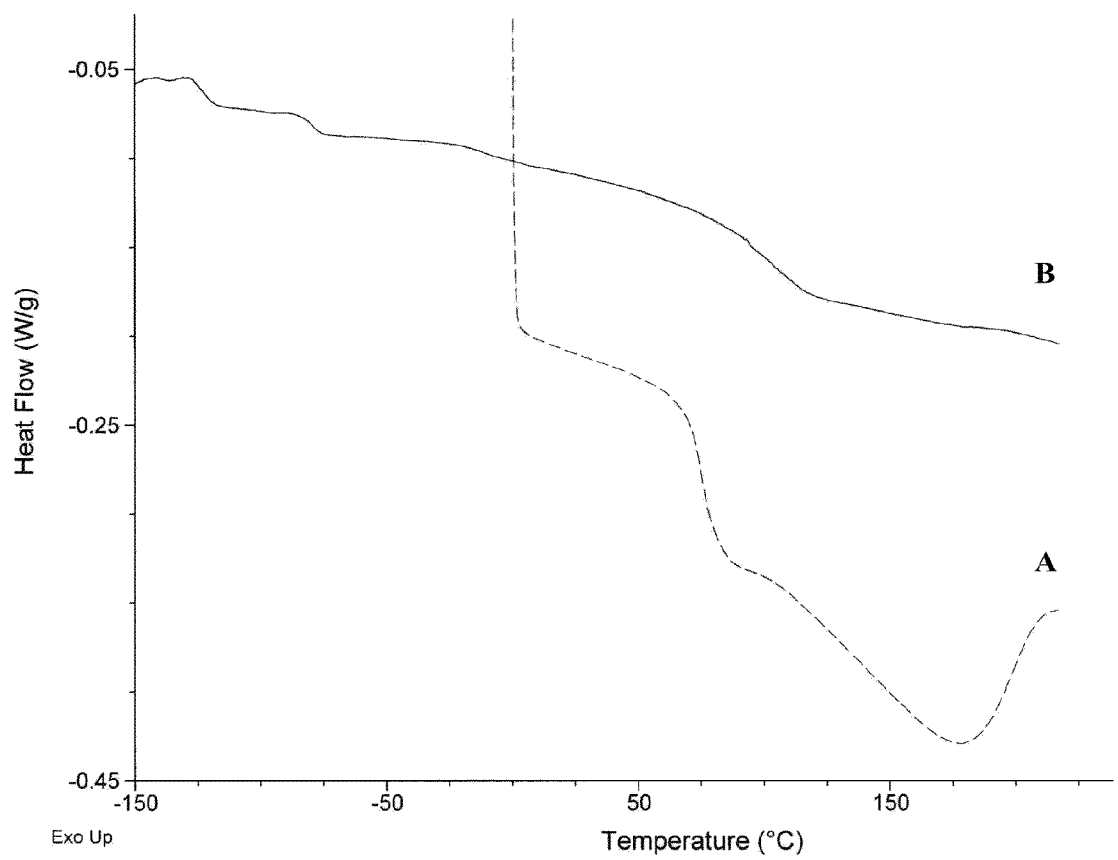
FIG. 4 is set of DSC traces for: (a) $PVA_{netw}$; and (b) $PVA_{netw}$-g-PDMS.

DSC:

FIG. 4 shows the DSC traces of PVA$_{netw}$ (trace A) and PVA$_{netw}$-g-PDMS (Trace B—Sample 3 of Table 1). PVA$_{netw}$ shows a broad melting transition (T$_m$) at 180° C. and a marked glass transition (T$_g$) at 75° C. In contrast, PVA$_{netw}$-g-PDMS shows only a relatively broad T$_g$ and no T$_m$. While not wishing to be bound to any one theory, the absence of the melting transition of the graft may be due to the restricted crystallization of PVA in the presence of PDMS segments. The T$_g$ at −122° C. clearly indicates PDMS incorporation. The transition at −80° C. is unidentified, and is observed consistently in all the samples examined.

Figure 5:
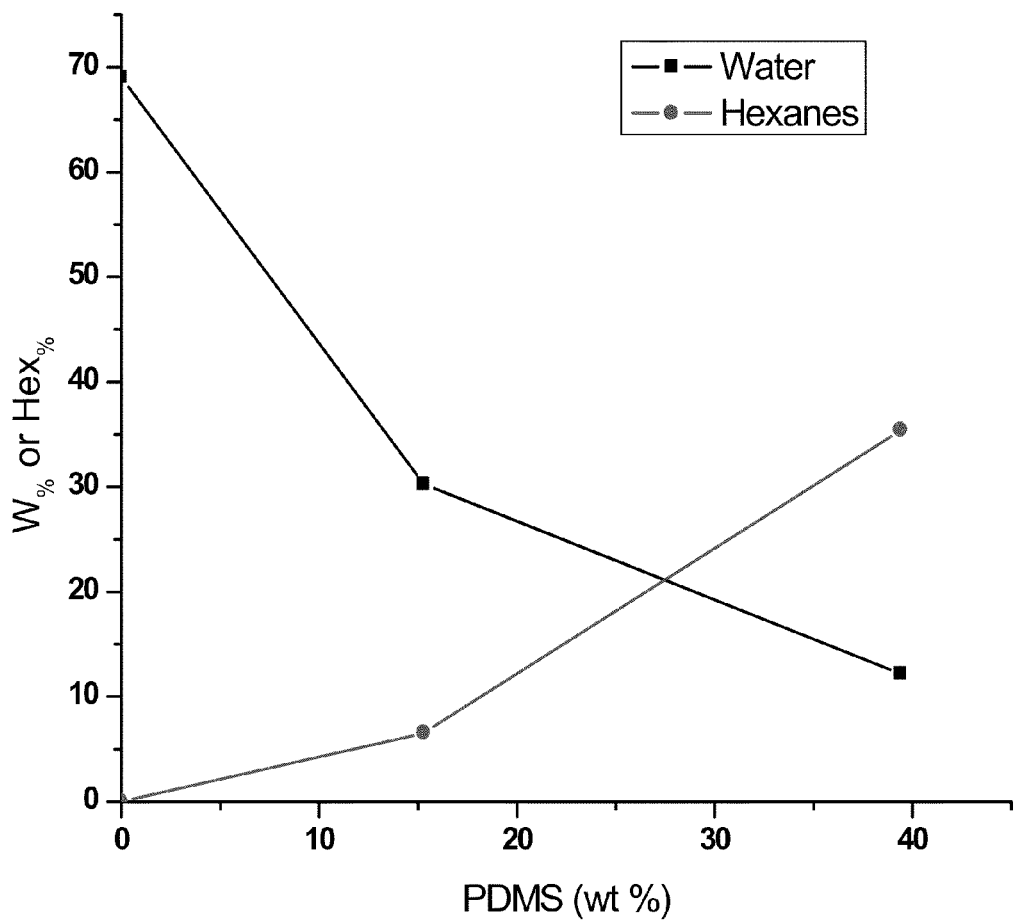
FIG. 5 is a graph of the equilibrium swelling of $PVA_{netw}$-g-PDMS in water or hexanes as the function of PDMS content (in dry samples).

Domain Co-Continuity:

The co-continuity of PVA and PDMS domains in PVA$_{netw}$-g-PDMS is proven by equilibrium swelling experiments. Table 1 details the equilibrium swelling of PVA$_{netw}$ and PVA$_{netw}$-g-PDMS in water and hexanes. FIG. 5 shows trends of swelling of PVA$_{netw}$-g-PDMS as the function of PDMS content. The swelling of PVA$_{netw}$-g-PDMS in water decreases with increasing PDMS content, and, conversely, its swelling in hexanes increases with increasing PDMS content.

The fact that PVA$_{netw}$-g-PDMS swells both in water and hexanes proves domain co-continuity of both the hydrophilic and hydrophobic domains.

Given the above, the grafting of PDMS branches (M$_n$=about 950 grams per mole or about 5,000 grams per mole) onto PVA$_{AA}$ (NELFILCON A®) occurs readily in NMP/THF solution by urethane linking of PDMS-NCO with the —OH groups of PVA. Subsequently, the PVA$_{AA}$-g-PDMS can be readily photo-crosslinked to PVA$_{netw}$-g-PDMS.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A polymer compound comprising the reaction product of:
   (I) at least one polydimethylsiloxane polymer in accordance with Formula (I) below:

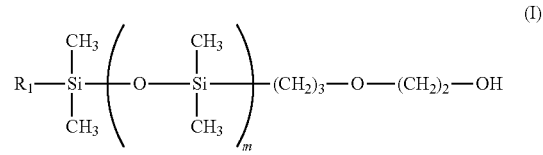

(I)

where m is equal to an integer in the range of about 5 to about 5,000 and where R$_1$ is a C$_1$ to C$_{20}$ linear alkyl group, or a C$_3$ to C$_{20}$ branched alkyl group;
   (II) at least one polyvinyl alcohol) having at least one photoreactive group per polymer chain; and
   (III) at least one isocyanate.

2. The polymer compound of claim 1, wherein R$_1$ is a C$_3$ to C$_{15}$ linear alkyl group, or a C$_5$ to C$_{15}$ branched alkyl group.

3. The polymer compound of claim 1, wherein R$_1$ is a C$_5$ to C$_{10}$ linear alkyl group, or a C$_7$ to C$_{10}$ branched alkyl group.

4. The polymer compound of claim 1, wherein the at least one polydimethylsiloxane polymer has a number average molecular weight (M$_n$) in the range of about 500 to about 11,000 grams per mole.

5. The polymer compound of claim 1, wherein the at least one polydimethylsiloxane polymer has a number average molecular weight (M$_n$) in the range of about 950 to about 5,000 grams per mole.

6. The polymer compound of claim 1, wherein the at least one poly(vinyl alcohol) has a molecular weight in the range of about 4,000 to about 25,000 grams per mole.

7. The polymer compound of claim 1, wherein the at least one poly(vinyl alcohol) has a molecular weight in the range of about 12,500 to about 15,000 grams per mole.

8. The polymer compound of claim 1, wherein the at least one isocyanate is selected from isophorone diisocyanate (IPDI), toluene-2,4-diisocyanate (TDI), or mixtures thereof.

9. The polymer compound of claim 1, wherein the reaction product produced by the mixture of claim 1 is subjected to photo-crosslinking to yield a co-network compound.

10. A polymer compound comprising the reaction product of:
(i) at least one polydimethylsiloxane polymer in accordance with Formula (II) below:

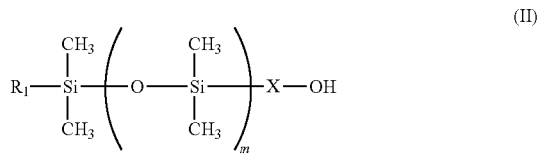

where m is equal to an integer in the range of about 5 to about 5,000, where $R_1$ is a $C_1$ to $C_{20}$ linear alkyl group, or a $C_3$ to $C_{20}$ branched alkyl group, and where X is a $C_1$ to $C_{20}$ linear alkyl group, a $C_3$ to $C_{20}$ branched alkyl group, a $C_2$ to $C_{20}$ ether group;
(ii) at least one poly(vinyl alcohol) having at least one photoreactive group per polymer chain; and
(iii) at least one isocyanate.

11. The polymer compound of claim 10, wherein $R_1$ is a $C_3$ to $C_{15}$ linear alkyl group, or a $C_5$ to $C_{15}$ branched alkyl group.

12. The polymer compound of claim 10, wherein $R_1$ is a $C_5$ to $C_{10}$ linear alkyl group, or a $C_7$ to $C_{10}$ branched alkyl group.

13. The polymer compound of claim 10, wherein X is a $C_1$ to $C_{20}$ linear alkyl group, a $C_3$ to $C_{20}$ branched alkyl group, or a $C_2$ to $C_{20}$ ether group.

14. The polymer compound of claim 10, wherein X is a $C_3$ to $C_{15}$ linear alkyl group, a $C_5$ to $C_{15}$ branched alkyl group, or a $C_3$ to $C_{15}$ ether group.

15. The polymer compound of claim 10, wherein X is a $C_5$ to $C_{10}$ linear alkyl group, a $C_7$ to $C_{10}$ branched alkyl group, or a $C_4$ to $C_{12}$ ether group.

16. The polymer compound of claim 10, wherein X is a $C_5$ to $C_{10}$ ether group, or even a $C_6$ to $C_8$ ether group.

17. The polymer compound of claim 10, wherein X, when it is an ether group, is a $C_2$ to $C_{20}$ alkyl ether group.

18. The polymer compound of claim 10, wherein X, when it is an ether group, is a $C_3$ to $C_{15}$ alkyl ether group.

19. The polymer compound of claim 10, wherein X, when it is an ether group, is a $C_4$ to $C_{12}$ alkyl ether group.

20. The polymer compound of claim 10, wherein X, when it is an ether group, is a $C_5$ to $C_{10}$ alkyl ether group.

21. The polymer compound of claim 10, wherein X, when it is an ether group, is a $C_6$ to $C_8$ alkyl ether group.

22. The polymer compound of claim 10, wherein $R_1$ is a linear or branched butyl group (—$C_4H_9$) and X is a —$(CH_2)_3$—O—$(CH_2)_2$— ether group.

23. The polymer compound of claim 10, wherein the at least one polydimethylsiloxane polymer has a number average molecular weight ($M_n$) in the range of about 500 to about 11,000 grams per mole.

24. The polymer compound of claim 10, wherein the at least one polydimethylsiloxane polymer has a number average molecular weight ($M_n$) in the range of about 950 to about 5,000 grams per mole.

25. The polymer compound of claim 10, wherein the at least one poly(vinyl alcohol) has a molecular weight in the range of about 4,000 to about 25,000 grams per mole.

26. The polymer compound of claim 10, wherein the at least one poly(vinyl alcohol) has a molecular weight in the range of about 12,500 to about 15,000 grams per mole.

27. The polymer compound of claim 10, wherein the at least one isocyanate is selected from isophorone diisocyanate (IPDI), toluene-2,4-diisocyanate (TDI), or mixtures thereof.

28. The polymer compound of claim 10, wherein the reaction produce produced by the mixture of claim 1 is further subjected to photo-crosslinking.

29. The polymer compound of claim 10, wherein the at least one isocyanate is selected from isophorone diisocyanate (IPDI), toluene-2,4-diisocyanate (TDI), or mixtures thereof.

30. The polymer compound of claim 10, wherein the reaction product produced by the mixture of claim 10 is subjected to photo-crosslinking to yield a co-network compound.

31. A method for producing a polymer compound comprising the steps of:
(A) providing at least one polydimethylsiloxane polymer in accordance with Formula (I) below:

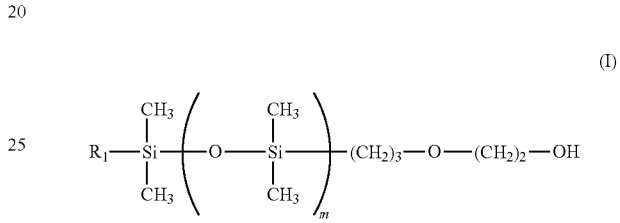

where m is equal to an integer in the range of about 5 to about 5,000 and where $R_1$ is a $C_1$ to $C_{20}$ linear alkyl group, or a $C_3$ to $C_{20}$ branched alkyl group;
(B) providing at least one poly(vinyl alcohol) having at least one and/or photoreactive group per polymer chain;
(C) providing at least one isocyanate; and
(D) reacting the compounds provided in Steps (A), (B) and (C) to produce a $PVA_{AA}$-g-PDMS polymer compound.

32. The method for producing a polymer compound of claim 31, wherein $R_1$ is a $C_3$ to $C_{15}$ linear alkyl group, or a $C_5$ to $C_{15}$ branched alkyl group.

33. The method for producing a polymer compound of claim 31, wherein $R_1$ is a $C_5$ to $C_{10}$ linear alkyl group, or a $C_7$ to $C_{10}$ branched alkyl group.

34. The method for producing a polymer compound of claim 31, wherein the at least one polydimethylsiloxane polymer has a number average molecular weight ($M_r$) in the range of about 500 to about 11,000 grams per mole.

35. The method for producing a polymer compound of claim 31, wherein the at least one polydimethylsiloxane polymer has a number average molecular weight ($M_n$) in the range of about 950 to about 5,000 grams per mole.

36. The method for producing a polymer compound of claim 31, wherein the at least one poly(vinyl alcohol) has a molecular weight in the range of about 4,000 to about 25,000 grams per mole.

37. The method for producing a polymer compound of claim 31, wherein the at least one poly(vinyl alcohol) has a molecular weight in the range of about 12,500 to about 15,000 grams per mole.

38. The method for producing a polymer compound of claim 31, wherein the at least one isocyanate is selected from isophorone diisocyanate (IPDI), toluene-2,4-diisocyanate (TDI), or mixtures thereof.

39. The method for producing a polymer compound of claim 31, wherein the reaction product produced by the method of 31 is subjected to photo-crosslinking step to yield a co-network compound.

40. A method for producing a polymer compound comprising the steps of:
(a) providing at least one polydimethylsiloxane polymer in accordance with Formula (II) below:

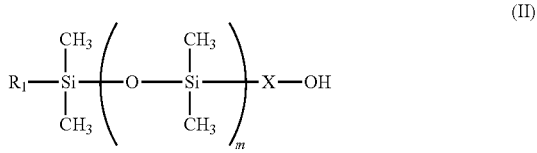

where m is equal to an integer in the range of about 5 to about 5,000, where $R_1$ is a $C_1$ to $C_{20}$ linear alkyl group, or a $C_3$ to $C_{20}$ branched alkyl group, and where X is a $C_1$ to $C_{20}$ linear alkyl group, a $C_3$ to $C_{20}$ branched alkyl group, a $C_2$ to $C_{20}$ ether group;
(b) providing at least one poly(vinyl alcohol) having at least one and/or photoreactive group per polymer chain;
(c) providing at least one isocyanate; and
(d) reacting the compounds provided in Steps (a), (b) and (c) to produce a $PVA_{AA}$-g-PDMS polymer compound.

41. The method for producing a polymer compound of claim 40, wherein $R_1$ is a $C_3$ to $C_{15}$ linear alkyl group, or a $C_5$ to $C_{15}$ branched alkyl group.

42. The method for producing a polymer compound of claim 40, wherein $R_1$ is a $C_5$ to $C_{10}$ linear alkyl group, or a $C_7$ to $C_{10}$ branched alkyl group.

43. The method for producing a polymer compound of claim 40, wherein X is a $C_1$ to $C_{20}$ linear alkyl group, a $C_3$ to $C_{20}$ branched alkyl group, or a $C_2$ to $C_{20}$ ether group.

44. The method for producing a polymer compound of claim 40, wherein X is a $C_3$ to $C_{15}$ linear alkyl group, a $C_5$ to $C_{15}$ branched alkyl group, or a $C_3$ to $C_{15}$ ether group.

45. The method for producing a polymer compound of claim 40, wherein X is a $C_5$ to $C_{10}$ linear alkyl group, a $C_7$ to $C_{10}$ branched alkyl group, or a $C_4$ to $C_{12}$ ether group.

46. The method for producing a polymer compound of claim 40, wherein X is a $C_5$ to $C_{10}$ ether group, or even a $C_6$ to $C_8$ ether group.

47. The method for producing a polymer compound of claim 40, wherein X, when it is an ether group, is a $C_2$ to $C_{20}$ alkyl ether group.

48. The method for producing a polymer compound of claim 40, wherein X, when it is an ether group, is a $C_3$ to $C_{15}$ alkyl ether group.

49. The method for producing a polymer compound of claim 40, wherein X, when it is an ether group, is a $C_4$ to $C_{12}$ alkyl ether group.

50. The method for producing a polymer compound of claim 40, wherein X, when it is an ether group, is a $C_5$ to $C_{10}$ alkyl ether group.

51. The method for producing a polymer compound of claim 40, wherein X, when it is an ether group, is a $C_6$ to $C_8$ alkyl ether group.

52. The method for producing a polymer compound of claim 40, wherein $R_1$ is a linear or branched butyl group ($-C_4H_9$) and X is a $-(CH_2)_3-O-(CH_2)_2-$ ether group.

53. The method for producing a polymer compound of claim 40, wherein the at least one polydimethylsiloxane polymer has a number average molecular weight ($M_n$) in the range of about 500 to about 11,000 grams per mole.

54. The method for producing a polymer compound of claim 40, wherein the at least one polydimethylsiloxane polymer has a number average molecular weight ($M_n$) in the range of about 950 to about 5,000 grams per mole.

55. The method for producing a polymer compound of claim 40, wherein the at least one poly(vinyl alcohol) has a molecular weight in the range of about 4,000 to about 25,000 grams per mole.

56. The method for producing a polymer compound of claim 40, wherein the at least one poly(vinyl alcohol) has a molecular weight in the range of about 12,500 to about 15,000 grams per mole.

57. The method for producing a polymer compound of claim 40, wherein the at least one isocyanate is selected from isophorone diisocyanate (IPDI), toluene-2,4-diisocyanate (TDI), or mixtures thereof.

58. The method for producing a polymer compound of claim 40, wherein the reaction produce produced by the mixture of claim 40 is further subjected to photo-crosslinking.

59. The method for producing a polymer compound of claim 40, wherein the at least one isocyanate is selected from isophorone diisocyanate (IPDI), toluene-2,4-diisocyanate (TDI), or mixtures thereof.

60. The method for producing a polymer compound of claim 40, wherein the reaction product produced by the method of 40 is subjected to photo-crosslinking step to yield a co-network compound.

61. A method for producing a polymer compound comprising the steps of:
(1) providing at least one polydimethylsiloxane polymer in accordance with either Formula (I) or Formula (II) below:

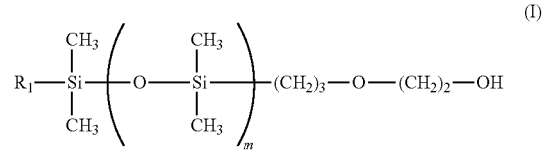

where m is equal to an integer in the range of about 5 to about 5,000 and where $R_1$ is a $C_1$ to $C_{20}$ linear alkyl group, or a $C_3$ to $C_{20}$ branched alkyl group, or

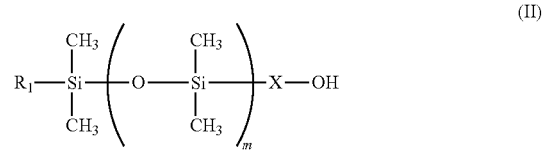

where m is equal to an integer in the range of about 5 to about 5,000, where $R_1$ is a $C_1$ to $C_{20}$ linear alkyl group, or a $C_3$ to $C_{20}$ branched alkyl group, and where X is a $C_1$ to $C_{20}$ linear alkyl group, a $C_3$ to $C_{20}$ branched alkyl group, a $C_2$ to $C_{20}$ ether group;
(2) conducting a solvent-based polymerization reaction by combining the at least one polydimethylsiloxane polymer in accordance with either Formula (I) or Formula (II) with at least one isocyanate and at least one catalyst in a suitable solvent to yield a polydimethylsiloxane polymer functionalized with at least one —NCO group; and
(3) combining the polydimethylsiloxane polymer functionalized with at least one —NCO group with at least one poly(vinyl alcohol) having at least one and/or photoreactive group per polymer chain and at least one binary solvent mixture to yield a $PVA_{AA}$-g-PDMS polymer compound.

62. The method for producing a polymer compound of claim 61, wherein Step (2) is conducted in THF.

63. The method for producing a polymer compound of claim 61, wherein Step (2) is conducted in THF at about 50° C. for about 5 hours.

64. The method for producing a polymer compound of claim 61, wherein Step (3) is conducted in a binary solvent of NMP and THF.

65. The method for producing a polymer compound of claim 61, wherein Step (3) is conducted in a binary solvent of NMP and THF at about 70° C. for about 12 hours.

66. The method for producing a polymer compound of claim 61, wherein the method further comprises Step (4), wherein Step (4) is a purification step that yields a purified $PVA_{AA}$-g-PDMS polymer compound.

67. The method for producing a polymer compound of claim 61, wherein the method further comprises the step of reacting the $PVA_{AA}$-g-PDMS polymer compound of Step (3) with at least one photoinitiator compound, at least one solvent and ultraviolet radiation to produce a $PVA_{netw}$-g-PDMS co-network compound.

68. The method for producing a polymer compound of claim 61, wherein the method further comprises the step of reacting the $PVA_{AA}$-g-PDMS polymer compound of Step (3) with NMP, IRGACURA® and ultraviolet radiation to produce a $PVA_{netw}$-g-PDMS co-network compound.

* * * * *

UNITED STATES PATENT AND TRADEMARK OFFICE
CERTIFICATE OF CORRECTION

PATENT NO. : 8,258,200 B2
APPLICATION NO. : 12/792644
DATED : September 4, 2012
INVENTOR(S) : Joseph P. Kennedy et al.

It is certified that error appears in the above-identified patent and that said Letters Patent is hereby corrected as shown below:

On the Title page of the Patent, item [75] please amend the named inventor's name "Ummadisetty Subramanyam" to "Subramanyam Ummadisetty"

Signed and Sealed this
Twenty-first Day of May, 2013

Teresa Stanek Rea
*Acting Director of the United States Patent and Trademark Office*